United States Patent [19]

Reider

[11] 3,972,607
[45] Aug. 3, 1976

[54] ANALOG/DIGITAL CONTROL ARRANGEMENT FOR PHOTOGRAPHIC APPARATUS
[75] Inventor: Alois Reider, Munich, Germany
[73] Assignee: AGFA-Gevaert, A.G., Leverkusen, Germany
[22] Filed: Dec. 30, 1974
[21] Appl. No.: 537,668

[52] U.S. Cl. .............................. 353/101; 352/141; 354/23 D; 354/44
[51] Int. Cl.² .......................... G03B 3/10; G03B 7/10
[58] Field of Search .................. 354/40, 41, 42, 43, 354/44, 60 R, 271, 23 D; 352/141; 353/101

[56] References Cited
UNITED STATES PATENTS
3,249,001  5/1966  Stauffer .......................... 353/101
3,430,053  2/1969  Westhaver ........................ 352/141

Primary Examiner—Richard E. Aegerter
Assistant Examiner—Steven L. Stephan
Attorney, Agent, or Firm—Michael J. Striker

[57] ABSTRACT

A bridge circuit which includes a photoelectric transducer furnishes input signals to a differential amplifier whose analog output signal varies in correspondence to the bridge unbalance. A first and second bistable threshold circuit changes the analog output signal into digital signals signifying bridge unbalance in a first direction, balance, and unbalance in the opposite direction. A motor is energized to rotate in a direction corresponding to the direction of bridge unbalance. The motor can be utilized to move the objective lens of a slide projector or change the aperture of a diaphragm.

11 Claims, 2 Drawing Figures

ANALOG/DIGITAL CONTROL ARRANGEMENT FOR PHOTOGRAPHIC APPARATUS

BACKGROUND OF THE INVENTION

This invention relates to photographic apparatus having an automatic control system including at least one light-sensitive element which is included in a bridge circuit whose output is in turn applied to the inputs of a differential amplifier. The output of the differential amplifier is used to furnish a signal controlling apparatus which rebalances the bridge. The control means must be able to move in a first or second direction in order to achieve this rebalance.

SUMMARY OF THE INVENTION

In accordance with the present invention photographic apparatus includes photoelectric transducer means for furnishing a light-dependent signal varying as a function of light falling thereon. It further comprises balanceable circuit means, including said photoelectric transducer means, for furnishing a first signal having a determined characteristic varying in dependence upon the balance, unbalance, and direction of said unbalance of said balanceable circuit means. Further comprised are first and second bistable circuit means connected to said balanceable circuit means and responsive to said determined characteristic of said first signal for furnishing a first, second and third digital output signal when said balanceable circuit means is unbalanced in a first direction, balanced, and unbalanced in a second direction respectively. Further comprised in the present invention are control means having an energizing circuit connected to said first and second bistable circuit means for varying the light falling on said photosensitive transducer means in response to said first and third combinations of digital output signals in a direction to rebalance said balanceable circuit means.

It will be seen that the bistable circuit means of the present invention convert the analog signal at the output of the differential amplifier into digital signals. The digital signals are then used to control the generally electromagnetic control means which function to rebalance the balanceable circuit means.

More specifically, a logic NAND-gate is connected to the output of the first and second bistable circuit means and furnishes an energizing signal whenever the balanceable circuit means are not in balance. The direction of unbalance is indicated by the absence of presence of a signal at the output of the first bistable circuit means.

The above-described system can be utilized in a number of different types of photographic apparatus. For example, in a slide projector the movement of the objective is controlled by a motor whose energization depends on the absence or presence of the energizing signal and the current flow through which (therefore the rotations thereof) being determined by the absence or presence of a signal at the output of the first bistable circuit means. The motor, in addition to moving the objective, also moves a source of illumination relative to a first and second light-sensitive element which forms part of the balanceable circuit means. When the circuit is re-balanced, the objective lens is in the proper position for effecting a sharp focus.

In an aperture control circuit, the present invention furnishes the energizing signal to a step motor whose direction of rotation is controlled by the output of the first bistable circuit means. The step motor is coupled to the main diaphragm to control the aperture thereof and is also coupled to an auxiliary diaphragm controlling the quantity of light falling on the photoelectric transducer means of the balanceable circuit means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
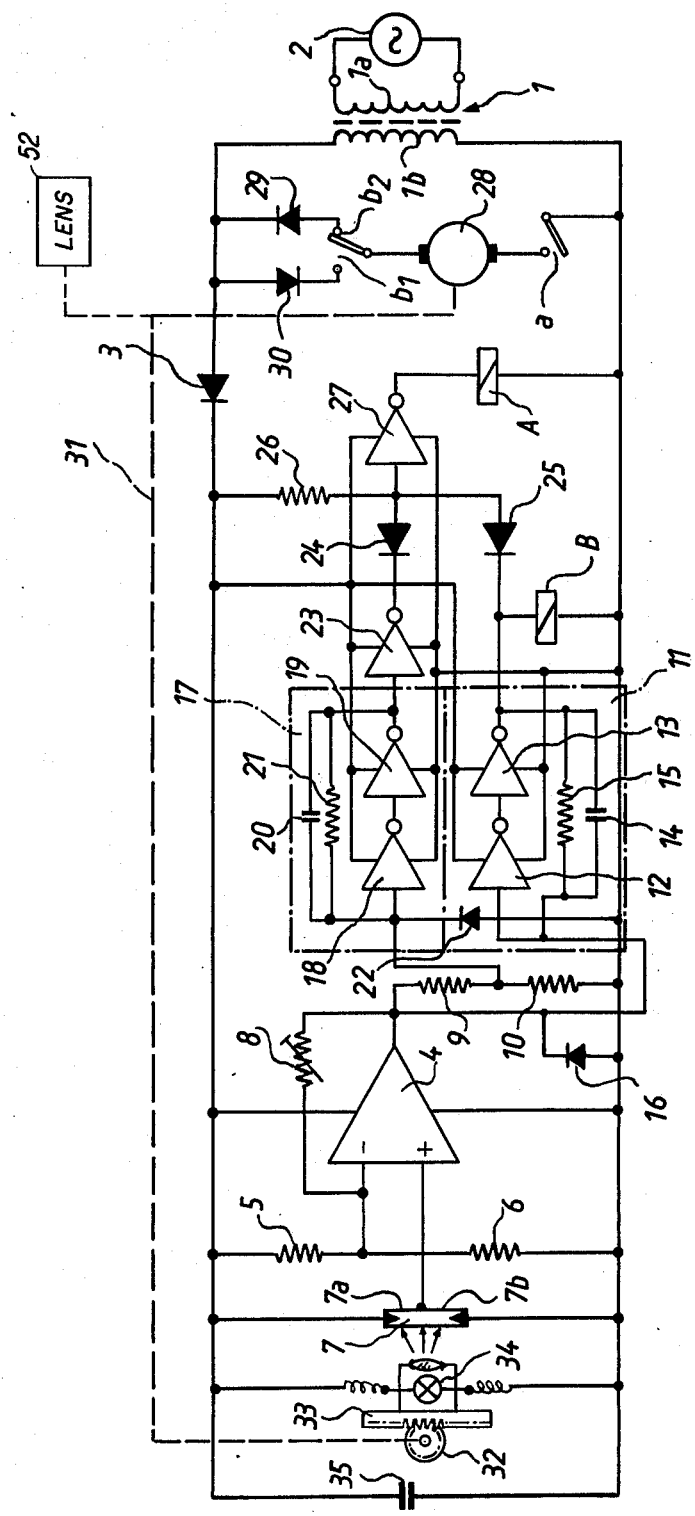
FIG. 1 shows an analog/digital control arrangement for automatic focussing in slide projectors.

A preferred embodiment of the present invention will now be described with reference to the drawing.

In FIG. 1, reference numeral 1 refers to a transformer whose input winding 1a is connected to a source of AC voltage 2 and whose secondary winding 1b is connected through a rectifier 3 to an operational amplifier 4. The inverting input of operational amplifier 4 is connected to the tap of a voltage divider comprising resistors 5 and 6. The direct input of the operational amplifier is connected with a photoresistor 7 (one embodiment of photoelectric transducing means) which comprises a first half 7a and a second half 7b. Both of the photoresistor halves 7a, 7b in conjunction with resistors 5 and 6 constitute a bridge circuit, namely a preferred embodiment of balanceable circuit means. A feedback resistor 8 is connected to operational amplifier 4. Two load resistors of operational amplifier 4 are denoted by reference numerals 9 and 10. The output of operational amplifier 4 is directly connected to the input of a first bistable circuit 11 which comprises two inverters 12, 13, connected in cascade having the parallel combination of a capacitor 14 and a resistor 15 as feedback circuit. A diode 16 connects the output of operational amplifier 4 to one side of the supply. The common point of resistors 9 and 10 is connected to the input of the second bistable circuit means which include a stage 17 including a first and second inverter 18, 19, connected in cascade and having a feedback circuit including the parallel combination of a capacitor 20 and a resistor 21. The second bistable circuit means further comprise an inverter 23 connected to the output of inverter 19. A diode 22 connects the input of the second bistable circuit means to one side of the supply.

An AND-gate including a diode 24 and a diode 25 as well as a resistor 26 has a first and second input respectively connected to the output of the first bistable circuit means and the output of inverter 23 namely the output of the second bistable circuit means. An inverter 27 is connected to the output of the AND-gate and converts it into a NAND-gate. At the output of the NAND-gate is connected the coil of a relay A. The output of inverter 27 is herein referred to as the energizing signal. Similarly, the output of stage 11 is referred to as the direction signal and, when present, energizes the coil of a relay B.

The contact *a* of relay A is connected into the energizing circuit of an electromotor 28. A selector switch having contacts $b_1$ and $b_2$ associated with relay B connects electromotor 28 either to a diode 29 or to a diode 30. Diode 29 allows current to flow in the first direction while diode 30 allows the current to flow in the opposite direction. A mechanical connection exists between electromotor 28 and a gear drive 32, 33. This gear drive causes a source of illumination, here a lamp 34, moved relative to photoresistor 7. Further moved by the gear drive is the objective lens (not shown). The position of lamp 34 relative to photoresistor 7 therefore corresponds to the position of the objective. A capacitor 35 serves to smooth the voltage applied by rectifier 3.

The above-described arrangement operates as follows: The circuit is designed so that when the bridge is balanced the input voltage to the first threshold means exceeds its threshold value causing it to change from a first to a second stable state. However, the voltage input to the second bistable circuit means, namely stage 17 and inverter 23, does not exceed the threshold value and this circuitry therefore remains in the first stable state. The circuit is so designed than when in the first stable state, a low output voltage results while, when in the second stable state, a high output voltage results. Therefore, the signal at the output of stage 11 will be high while that of the output of stage 17 will be low causing the output of inverter 23 to be high. Since two "1" signals are applied to the inputs of the NAND-gate, its output will be low causing relay A to be deenergized. Contacts *a* in the motor circuit will thus be open and the motor will be deenergized. Thus no corrective motion occurs when the circuit is balanced.

Now let it be assumed that when the circuit is unbalanced in a first direction, the output voltage of operational amplifier 4 is zero so that the input neither to stage 11 nor to stage 17 exceeds the threshold value. Under this condition, the output of inverter 23 will be high and the output of stage 11 will be low. Relay B will be deenergized causing the selector switch to be in the position shown in the drawing. However relay A will be energized since the output of inverter 27 will be high. Thus switch *a* will close allowing the motor to operate until the balance condition of the bridge circuit has been restored.

In the third case the bridge circuit is unbalanced in the second direction. Under this condition the output voltage of differential amplifier 4 will be sufficiently high to cause the threshold of both stage 11 and stage 17 to be exceeded. Relay B is thus energized causing the selector switch contacts to switch to contact $b_1$ thereby reversing the current flow through motor 28. Further, since the output of stage 17 will be high, that of inverter 23 will be low causing a "0" and a 1 to be applied to the NAND-gate thereby causing a high output at inverter 27. This causes relay A to be energized closing contact *a* and allowing the energization of motor 28. Motor 28 then moves the gearing 32, 33 in such a way that lamp 34 is repositioned relative to photoresistor 7 and also simultaneously moves the objective. Further, gearing moves lens 52 correspondingly. When the bridge is balanced, the output voltage of operational amplifier 4 will still be sufficiently high to maintain stage 11 in the second stable state, but will no longer be sufficient to maintain circuit 17 in the second stable state. The output of inverter 23 will thus be a 1 while the output of circuit 11 will remain a 1.

Relay A will be deenergized, while relay B will remain energized. As soon as relay A is deenergized of course motor 28 stops. It is thus seen that the circuit of the present invention as shown in FIG. 1 will tend to return the bridge circuit to the balanced state.

Figure 2:
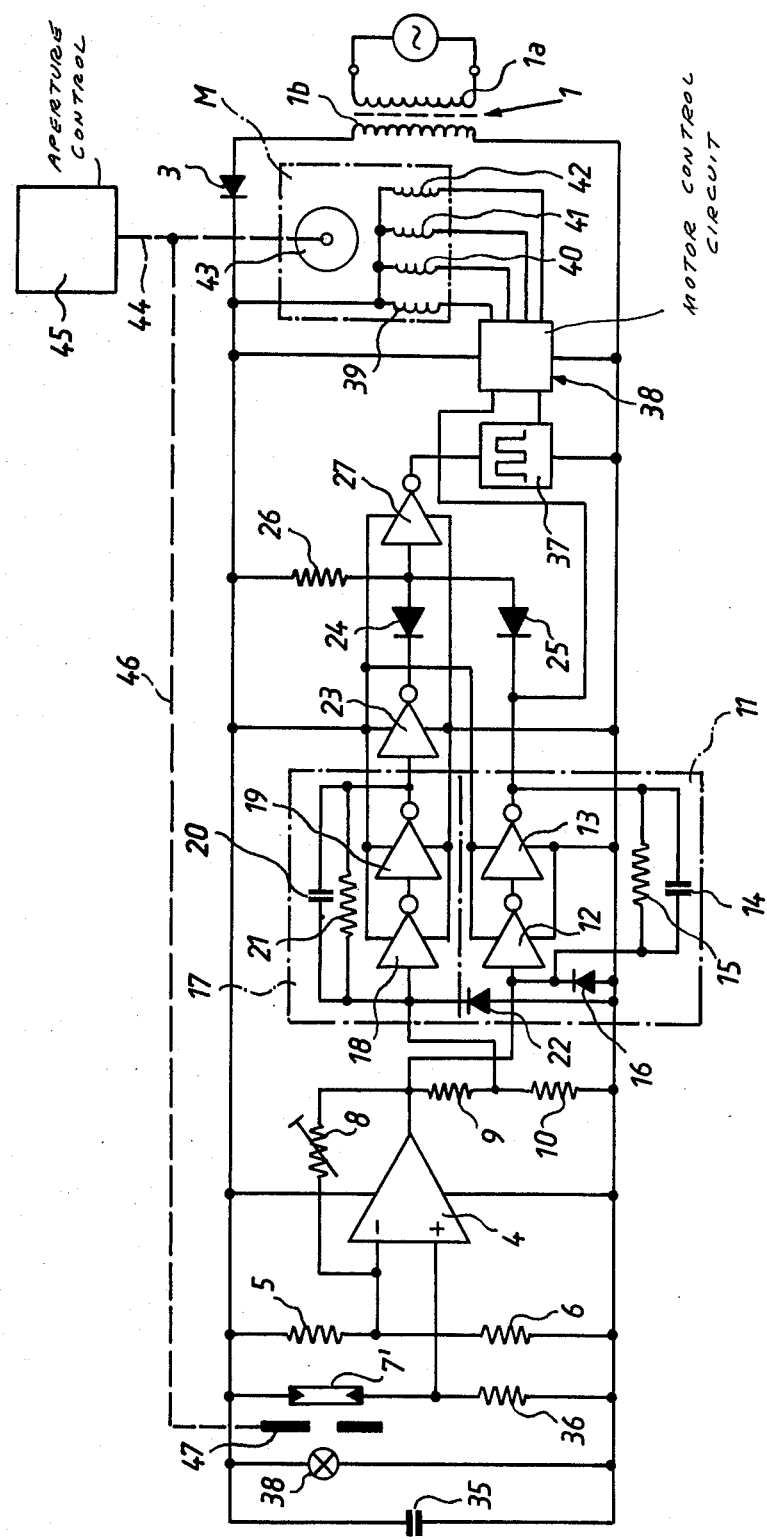
FIG. 2 shows an automatic control arrangement for stepwise adjustment of the aperture of a diaphragm.

Referring now to FIG. 2, it will be noted that those elements which are the same in FIG. 1 as in FIG. 2 have the same reference numerals. FIG. 2 differs from FIG. 1 in that the output of inverter 27 is connected to the enabling input of a pulse generator 37 which, when so enabled, energizes a step motor control circuit 38. Circuit 38 causes the pulses applied thereto to be applied in a predetermined sequence to the windings 39, 40, 41 and 42 of step motor M. The armature of the step motor is denoted by reference numeral 43. It is mechanically coupled by a coupling 44 to the diaphragm 45. A further mechanical connection 46 allows simultaneous adjustment of an auxiliary diaphragm 47 positioned between light 38 and a photoresistor 7'. Photoresistor 7' constitutes a part of a bridge circuit and is connected in series with a resistor 36. As in FIG. 1, the resistors further constituting the bridge circuit have reference numerals 5 and 6. The operation of the circuit is similar to that of FIG. 1. Again, when the bridge circuit is balanced the threshold values for stage 11 is exceeded while that for stage 17 is not. The resulting 0 output at inverter 27 blocks pulse generator 37 and therefore causes step motor M to remain at rest. When the circuit is unbalanced in the first direction the output voltage of differential amplifier 4 is approximately equal to zero, thereby causing both stages 11 and 17 to remain in the first stable state. Again as in FIG. 1, this causes a 1 output at inverter 23 and a 0 output of stage 11. This combination causes the output of inverter 27 to be a 1 thereby allowing pulses to pass from pulse generator 37 through control circuit 38 to the windings 39-42 of step motor M. In the absence of a signal at the output of stage 11, circuit 38 operates to energize the windings in a first predetermined order. When the bridge circuit is unbalanced in the opposite direction, the windings will be energized in the opposite order and armature 43 to rotate in the opposite direction.

It is seen that the present invention allows a very simple conversion of the output signal of operational amplifier 4 to a digital signal signifying unbalance, namely the energizing signal at the output of inverter 27 and to a second digital signal indicative of the required direction for correction, namely the signal at the output of stage 11.

While the present invention has been shown to be interconnected with aperture control apparatus and with automatic slide focussing apparatus, it is of course in no way limited to these applications. It is further in no way limited to the particular embodiments of the digital circuit shown.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Photographic apparatus, comprising, in combination, photoelectric transducer means for furnishing a light-dependent signal varying as a function of light falling thereon; balanceable circuit means including said photoelectric transducer means for furnishing a first signal having an amplitude less than a predetermined first threshold amplitude when said balanceable circuit means is unbalanced in a first direction, an amplitude exceeding said predetermined first threshold amplitude and less than a predetermined second threshold amplitude when said balanceable circuit means is balanced, and an amplitude exceeding a predetermined second threshold amplitude when said balanceable circuit means is unbalanced in a second direction opposite to said first direction; first and second bistable circuit means connected to said balanceable circuit means and responsive to the amplitude of said first signal for furnishing a first, second or third digital output signal when said balanceable circuit means is unbalanced in said first direction, balanced, and unbalanced in said second direction respectively; and control means having an energizing circuit connected to said first and second bistable circuit means for varying the light falling on said photosensitive transducer means in response to said first and third digital output signals in a direction to rebalance said balanceable circuit means.

2. Apparatus as set forth in claim 1, wherein said balancable circuit means comprise a bridge circuit and a differential amplifier connected to the output of said bridge circuit for furnishing said first signal; and wherein said determined characteristic of said first signal is the amplitude of said first signal.

3. Apparatus as set forth in claim 2, wherein said first bistable circuit means comprise a bistable threshold stage adapted to change from a first to a second stable state when the amplitude of said first signal exceeds said first threshold amplitude; wherein said second bistable circuit means comprise a second bistable threshold stage adapted to change from a first to a second stable state when said amplitude of said first signal exceeds said second threshold amplitude, and an inverter connected to the output of said second bistable threshold stage.

4. Apparatus as set forth in claim 3, wherein said first and second bistable threshold stages are substantially identical stages; further comprising voltage divider means interconnected between the output of said differential amplifier and the input of said second bistable threshold stage for voltage dividing said first signal and applying a reduced first signal to said second bistable threshold stage.

5. Apparatus as set forth in claim 3, wherein said control means is energized in the presence of an energizing signal, deenergized in the absence of said energizing signal, and is operable in a first or second direction in response to the absence or presence of a direction signal respectively; further comprising logic circuit means connected to the outputs of said first and second bistable threshold stages for furnishing said energizing signal in response to said first and third digital output signals.

6. Apparatus as set forth in claim 5, wherein said logic circuit means comprise a NAND circuit having a first input connected to the output of said first bistable threshold stage, a second input connected to the output of said inverter, and an output for furnishing said energizing signal.

7. Apparatus as set forth in claim 6, further comprising means connected to said first bistable threshold circuit for furnishing said direction signal only when said first bistable threshold circuit is in said second state.

8. Apparatus as set forth in claim 7, wherein said first and second bistable threshold stage each comprise a pair of inverter stages connected in cascade and a feedback network connected from the output to the input of the so-connected stages.

9. Apparatus as set forth in claim 7, wherein said photographic apparatus is a slide projector having an objective lens and first moving means for moving said objective lens along a predetermined path in a first or second direction; wherein said photoelectric transducer means comprise a first and second light-sensitive element and illuminating means for illuminating said light-sensitive element; and wherein said control means comprise second moving means mechanically coupled to said first moving means for movement therewith, for moving said illuminating means in response to said energizing signal along a predetermined path relative to said first and second light-sensitive elements and in a first or second direction corresponding to, respectively, the absence or presence of said direction signal.

10. Apparatus as set forth in claim 9, said second moving means comprise a motor; further comprising a source of electrical energy; wherein said energizing circuit includes a relay having a relay coil connected to the output of said inverter and a pair of relay contacts closed upon energization of said relay coil and connecting said motor to said source of electrical energy when closed.

11. Apparatus as set forth in claim 10, further comprising a relay coil connected to the output of said first bistable threshold stage and a selector switch connected between said motor and said source of electrical energy for reversing the direction of current flow through said motor upon energization of said relay coil.

* * * * *

UNITED STATES PATENT AND TRADEMARK OFFICE
CERTIFICATE OF CORRECTION

PATENT NO. : 3,972,607
DATED : August 3, 1976
INVENTOR(S) : Alois Rieder

It is certified that error appears in the above-identified patent and that said Letters Patent are hereby corrected as shown below:

Directly under "United States Patent [19]", the name of the inventor should read -- Rieder --.

In the heading [75], the name of the inventor should read -- Alois Rieder --.

*Signed and Sealed this*

Twenty-sixth *Day of* October 1976

[SEAL]

*Attest:*

RUTH C. MASON
*Attesting Officer*

C. MARSHALL DANN
*Commissioner of Patents and Trademarks*